United States Patent [19]
Brown

[11] 3,902,107
[45] Aug. 26, 1975

[54] CIRCUIT FOR PROTECTING SERIES-CONNECTED SWITCHES

[75] Inventor: Harold J. Brown, Lorain, Ohio

[73] Assignee: Lorain Products Corporation, Lorain, Ohio

[22] Filed: Sept. 26, 1974

[21] Appl. No.: 509,422

[52] U.S. Cl. ............................. 321/12; 321/45 C
[51] Int. Cl.² ................... H02M 1/18; H02M 7/515
[58] Field of Search .............. 321/5, 11, 12, 13, 43, 321/44, 45 R, 45 C, 45 ER; 307/252 M

[56] References Cited
UNITED STATES PATENTS

| | | | |
|---|---|---|---|
| 3,601,683 | 8/1971 | Brown | 321/45 C |
| 3,710,230 | 1/1973 | Ve Nard | 321/45 C |
| 3,805,141 | 4/1974 | Pompa et al. | 321/11 |
| 3,820,006 | 6/1974 | Phillips | 321/45 R |

Primary Examiner—William H. Beha, Jr.
Attorney, Agent, or Firm—Edward C. Jason

[57] ABSTRACT

The disclosed circuit limits the rate of change of voltage across two series-connected, alternately-conducting switching components. Capacitors are connected across each of two series-connected switching components, e.g., thyristors, to limit the rate of change in voltage across each switching component. When both switches are non-conducting, the capacitor which is connected across the last conducting switch is charged at a rate which is less than the critical rate of change of forward off-state voltage for that switch. This prevents the rate of change of voltage across that switch from turning on that switch prematurely. In addition, the capacitor which is connected across the next conducting switch is discharged to establish a relatively low voltage thereacross. This prevents that capacitor from establishing a current which would damage the next conducting switch upon the turn on thereof.

17 Claims, 3 Drawing Figures

3,902,107

CIRCUIT FOR PROTECTING SERIES-CONNECTED SWITCHES

BACKGROUND OF THE INVENTION

The present invention relates to inverter circuits and is directed more particularly to circuitry for protecting the thyristors of an inverter from excessive rates of change in voltage.

In thyristor converter circuits which utilize limited inverse voltage commutation, an excessive rate of change may occur in the forward voltage across each thyristor after turn off. This excessive rate of change of voltage (usually called the rate of rise of off-state voltage) may turn on that thyristor prematurely, thereby short-circuiting the power source which drives the converter. In order to prevent this premature turn-on, resistor-capacitor networks, or snubbers, have been connected across each thyristor to prevent excessive rates of change in the voltage thereacross.

These snubber circuits are not only complicated but also require exotic components which must withstand peak voltages and currents far greater than usual voltage and current ratings. Even with these exotic components, however, the current and voltage ratings are sometimes exceeded, resulting in component failure. Thus, snubber circuits are not entirely satisfactory for limiting the rate of change of voltage across power thyristors.

Another attempt to limit the rates of change in voltage across series-connected thyristors has involved capacitors connected across each thyristor. Prior to the present invention, however, the mere connection of capacitors across series-connected power thyristors has been unsatisfactory. This is because such capacitors damage the associated thyristors in the course of discharging therethrough.

The present invention utilizes capacitors connected across each power thyristor and voltage shifting circuitry which cooperates with the capacitors not only to limit the rate of rise of voltage across either power thyristor, but also to limit the rate of rise of voltage without establishing capacitive discharge currents which would damage the power thyristors.

SUMMARY OF THE INVENTION

It is an object of the invention to provide circuitry for limiting the rate of rise of voltage across alternately-conducting, series-connected thyristors.

Another object of the invention is to provide circuitry to limit the rate of rise of forward voltage across either thyristor each time that thyristor turns off.

Still another object of the invention is to provide circuitry of the above character which does not establish discharge currents through either thyristor during turn on thereof.

A further object of the invention is to provide a capacitor across each series-connected power thyristor to limit the rate of rise of forward voltage thereacross and circuitry which interchanges the voltages across these capacitors when both thyristors are non-conducting.

It is another object of the invention to provide circuitry which assures that after each thyristor turns off, the capacitor connected across it charges at a controllable rate.

A further object of the invention is to provide circuitry of the above character which assures that when each thyristor turns on, the capacitor connected across it is substantially uncharged.

Yet another object of the invention is to provide a capacitor across each of the two series-connected power thyristors and to provide voltage shifting circuitry which, when both thyristors are non-conducting, discharges the charged capacitor and charges the uncharged capacitor.

DESCRIPTION OF THE PREFERRED EMBODIMENTS

Figure 1:
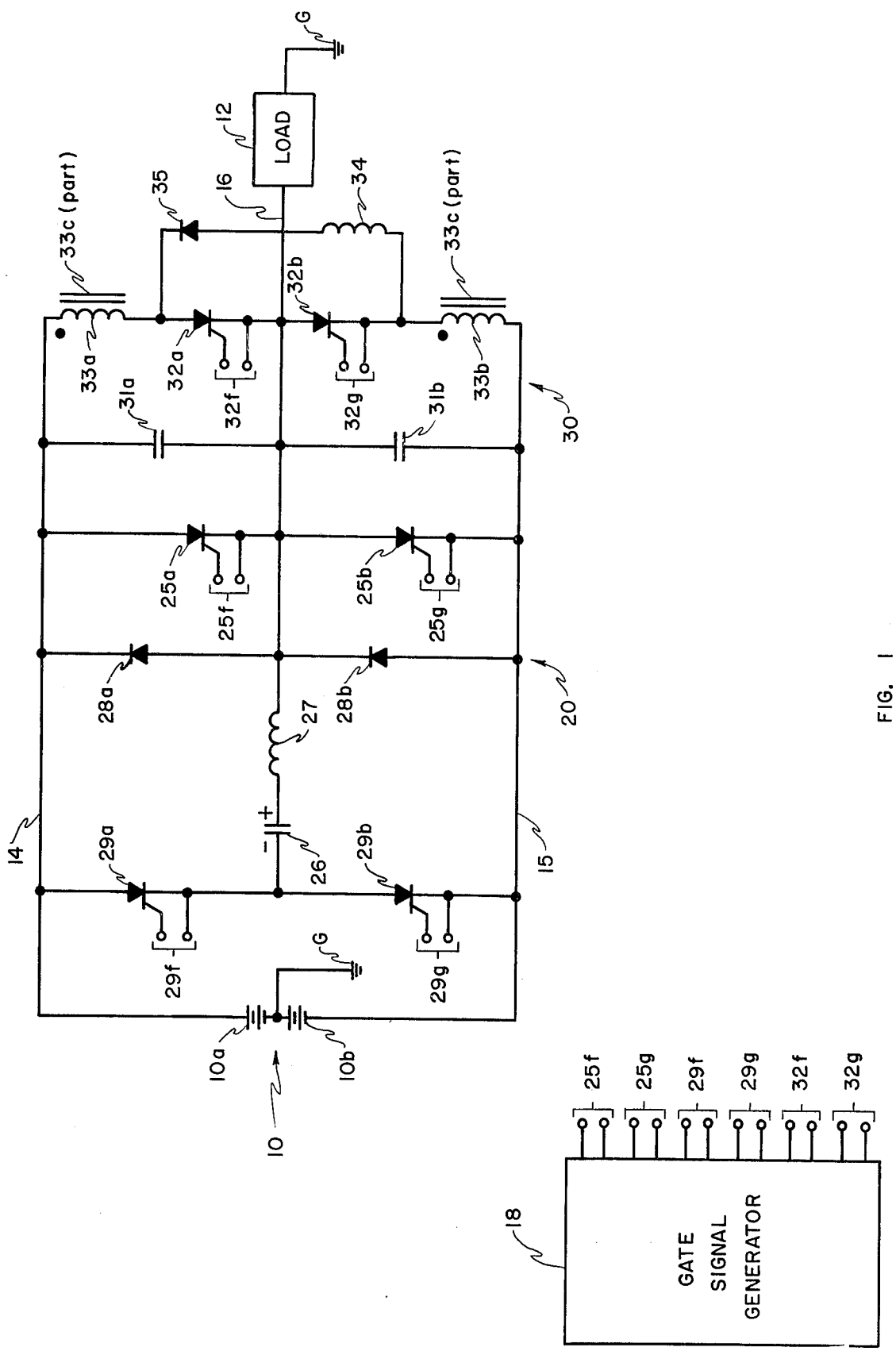
FIG. 1 is a schematic diagram of one illustrative embodiment of the invention.

Referring to FIG. 1, there is shown an inverter 20 for supplying an a-c voltage to a load 12 which is connected between an a-c bus 16 and ground G. Inverter 20 is energized from a center tapped d-c voltage supply 10 having a positive section 10*a* connected between a positive bus 14 and ground G and a negative section 10*b* connected between a negative bus 15 and ground G. Thus, inverter 20 serves to convert the d-c voltage appearing between the positive and negative busses to an a-c voltage appearing between a-c bus 16 and ground G.

In order to convert the d-c voltage of supply 10 into a suitable a-c voltage, there are provided in inverter 20 series-connected power switching components 25*a* and 25*b*, shown herein as thyristors, a commutating capacitor 26, a commutating inductor 27, commutating diodes 28*a* and 28*b*, and commutating switches 29*a* and 29*b*, also shown herein as thyristors. Series-connected power thyristors 25*a* and 25*b* alternately conduct to connect the positive and negative sections of the d-c voltage supply 10 to a-c bus 16 and thereby establish the positive and negative half-cycles of the desired a-c voltage. Commutating elements 26 through 29*b* operate at the end of each half-cycle of the a-c voltage, to turn off the then conducting power thyristor. Thus, power thyristors 25*a* and 25*b*, capacitor 26, inductor 27, diodes 28*a* and 28*b*, and commutating thyristors 29*a* and 29*b* cooperate to convert the d-c voltage between the positive and negative busses to a squarewave voltage between a-c bus 16 and ground G.

Inverter 20 is commonly known as a McMurray inverter and is described in detail in the U.S. Pat. of W. McMurray, No. 3,207,974, issued on Sept. 21, 1965. Because, therefore, the operation of inverter 20 is well-known, the operation thereof will be described herein only generally and only to the extent necessary to afford an understanding of its relationship to the invention. In order to initiate the positive half-cycle of the desired a-c voltage, a gate signal generator 18 applies to gate terminals 25*f* of thyristor 25*a* a firing pulse of suitably high voltage and current to turn on that thyristor. As thyristor 25*a* turns on, current will flow from positive supply 10*a* through positive bus 14, thyristor 25*a*, a-c bus 16, and load 12 to ground G. Under this condition, a positive voltage which is approximately equal to the voltage of supply 10*a* is established across load 12.

Thereafter, in order to terminate the positive half-cycle of the a-c voltage, gate signal generator 18 applies to gate terminals 29f of thyristor 29a a suitable firing pulse to turn on that thyristor. Under this condition, capacitor 26, which was charged to a voltage somewhat greater than the voltage of supply 10 with the polarity shown in FIG. 1 during the previous half-cycle, will discharge in the loop including inductor 27, thyristor 25a, positive bus 14, and thyristor 29a. As the magnitude of this discharge current increases and becomes equal to the magnitude of the load current through thyristor 25a, that thyristor will turn off. As thyristor 25a turns off, diode 28a will become forward biased and conduct the discharge current which had flowed through thyristor 25a. Because this current flows both through capacitor 26 and inductor 27, however, it is a resonant current and will continue to flow until the polarity of the capacitor voltage reverses. At that time, diode 28a will become reverse biased and thereby prevent further reversals in the capacitor voltage. At this time, the magnitude of the voltage across capacitor 26 is somewhat less that the voltage of supply 10 due to losses occurring during the turn-off of thyristor 25a. Thus, upon the turn-on of thyristor 29a, capacitor 26 resonantly discharges through inductor 27 to turn off thyristor 25a and to reverse the polarity of its terminal voltage.

In order to restore the voltage across capacitor 26 to the value it had prior to the turn-off of thyristor 25a and thereby place it in condition for the next communtating event, gate signal generator 18 turns on thyristor 25b before thyristor 29a turns off. Under this condition, current will flow in a loop including supply 10, thyristor 29a, capacitor 26, inductor 27, thyristor 25b, and negative bus 15 to charge capacitor 26 and store energy in inductor 27. Thereafter, as the capacitor voltage becomes equal to that of supply 10, the flywheel effect of inductor 27 causes current flow to continue and thereby charge capacitor 26 to a voltage somewhat greater than that of supply 10. Still later, as capacitor 26 attempts to reverse the direction of current flow, thyristor 29a will turn off, leaving capacitor 26 fully charged and ready for the next commutating event.

In addition to restoring capacitor 26 to a fully charged condition, the turn-on of thyristor 25b also establishes a current from negative supply 10b through ground G, load 12, a-c bus 16, and thyristor 25b to negative bus 15. The flow of the latter current comprises the beginning of the negative half-cycle of the a-c voltage since, under this condition, a negative voltage approximately equal to the voltage of negative supply 10b is established across load 12.

It will be understood that the turn-on of thyristor 29b terminates this negative half-cycle of the a-c voltage in a manner similar to the termination of the positive half-cycle of the a-c voltage by the turn-on of thyristor 29a.

In view of the foregoing, it will be seen that thyristor 25a is turned on to initiate the positive half-cycle of the a-c voltage, that thyristor 29a is turned on to turn off thyristor 25a before the beginning of the negative half-cycle of the a-c voltage, that thyristor 25b is turned on to initiate the negative half-cycle of a-c voltage, and that thyristor 29b is turned on to turn off thyristor 25b before the beginning of the positive half-cycle of voltage. It will also be seen that, upon the turn-on of either power thyristor, the voltage of d-c supply 10 is applied across the other or last conducting power thyristor. Since the supply voltage is applied across the last conducting thyristor in the time that it takes for the ongoing thyristor to turn on, the rate of rise of voltage (i.e., the $dv/d_t$) may turn on the last conducting thyristor. If this occurs, thyristors 25a and 25b will conduct at the same time, causing a short circuit across d-c supply 10. This short circuit not only causes loss of control over the inverter but also destroys the thyristors.

In order to prevent thyristors 25a and 25b from conducting at the same time, there are provided, in the present embodiment, capacitors 31a and 31b which are connected across thyristors 25a and 25b, respectively. These capacitors prevent the rate of change of voltage across both thyristors from exceeding the value at which $dv/d_t$ turn-on can occur. In other words, capacitors 31a and 31b limit the rate of rise of forward voltage across series-connected power thyristors 25a and 25b.

The mere connection of capacitors across the power thyristors, however, is unsatisfactory because of the excessive load and discharge currents that flow through the thyristors during each turn on thereof. In other words, the charged capacitors establish currents which damage the associated thyristors upon turn on thereof.

In order to allow these capacitors to be connected in the above manner without causing damage to the power thyristors, there is provided in FIG. 1, voltage shifting means 30 including first and second discharging switches 32a and 32b, shown herein as thyristors, a current transformer having a first winding 33a and a second winding 33b wound on a common core 33c, an inductor 34, and a diode 35. When both of the power thyristors are nonconducting, voltage shifting means 30 serves to discharge the capacitor connected across the next conducting thyristor and thereby prevent that capacitor from establishing destructive currents therethrough. At the same time, voltage shifting means 30 serves to charge the capacitor connected across the last conducting thyristor at a predetermined rate and thereby prevent excessive rates of rise of forward voltage across that thyristor. Thus, voltage shifting means 30 not only eliminates the problem of excessive rates of change of thyristor voltages but also eliminates the problem of excessive thyristor currents.

The operation of inverter 20 in the presence of voltage shifting network 30 will now be described. Assuming that thyristor 25b is conducting, for example, inverter 20 establishes the negative half-cycle of the a-c voltage. Under this condition, capacitor 31b is uncharged and capacitor 31a is charged to the voltage of supply 10. Before the beginning of the positive half-cycle of the a-c voltage, thyristor 29b is turned on to resonantly discharge capacitor 26 through thyristor 25b and thereby turn off that thyristor. Thereafter, thyristor 29b turns off as the direction of current flow in the loop attempts to reverse. Thus, before the beginning of the positive half-cycle of the a-c voltage, power thyristors 25a and 25b are both non-conducting, commutating thyristors 29a and 29b are both non-conducting, capacitor 31b is uncharged, and capacitor 31a is fully charged.

While both power thyristors are non-conducting, gate signal generator 18 turns on thyristor 32a of voltage shifting network 30. The turn-on of thyristor 32a establishes a first discharging path including capacitor 31a, winding 33a, and thyristor 32a. Under this condition, the voltage across capacitor 31a appears across winding 33a of current transformer 33. Because of the coupling between windings 33a and 33b, a voltage substantially equal to the voltage across winding 33a is induced across winding 33b. This induced voltage forward biases diode 35 and establishes a first charging path including winding 33b, inductor 34, diode 35, thyristor 32a, and capacitor 31b. The current flow in this latter path charges capacitor 31b at a rate determined primarily by the values of capacitors 31a and 31b and inductor 34 and is, therefore, a resonant current flow. At the same time, due to the coupling between windings 33a and 33b, the current flow in the first discharging path discharges capacitor 31a at a similar rate and also is, therefore, a resonant current flow. Thus, the turn-on of thyristor 32a establishes, through a first discharging path, a resonant current flow which discharges capacitor 31a at a predetermined rate and, through a first charging path, a resonant current flow which charges capacitor 31b at substantially the same rate.

As capacitor 31a discharges, the coupling between windings 33a and 33b causes capacitor 31b to charge until the voltages across both capacitors are equal. At this time, due to the flywheel effect of inductor 34, capacitor 31b continues to charge and capacitor 31a continues to discharge until capacitor 31b is charged to a voltage substantially equal to the voltage of supply 10 and capacitor 31a is discharged to a voltage substantially equal to zero.

After capacitor 31b is fully charged, diode 35 becomes reverse biased to stop the flow of current through the capacitors and thereby prevents a further exchange of energy therebetween. In addition, as the above described current decreases to zero, thyristor 32a turns off. At this time, capacitor 31a is uncharged and capacitor 31b is fully charged. It will, therefore, be seen that, before the beginning of the positive half-cycle of the a-c voltage, voltage shifting means 30 forces capacitor 31a to assume a discharged condition. As a result, thyristor 25a can be turned on to establish the positive half-cycle of the a-c voltage without giving rise to a destructive capacitive discharge therethrough. It will also be seen that, before the beginning of the positive half-cycle of the a-c voltage, voltage shifting means 30 not only forces capacitor 31b to assume a fully charged condition, but also forces it to assume that charged condition at a predetermined rate. As a result, thyristor 25b will be exposed to its full forward voltage without having been exposed to excessive rates of change in that forward voltage.

It will be understood that since thyristor 29b was allowed to turn off before thyristor 25a was turned on, capacitor 26 may not be restored to its fully charged condition after having turned off thyristor 25b. In order to restore capacitor 26 to that condition, thyristor 29b may be turned on with thyristor 25a after the capacitor voltages have been shifted. Thus, the firing sequence of thyristors 25a, 25b, 29a, and 29b may be different from the firing sequence which would be utilized in the absence of voltage shifting network 30.

Similarly, after thyristor 29a has been turned on to turn off thyristor 25a before the beginning of the negative half-cycle of the a-c voltage, power thyristors 25a and 25b are both non-conducting, capacitor 31a is uncharged and capacitor 31b is fully charged. At this time, gate signal generator 18 turns on thyristor 32b to initiate an exchange of energy between capacitors 31a and 31b in a direction opposite to that described above in connection with the turn-on of thyristor 32a. More particularly, as thyristor 32b is turned on, the voltage across capacitor 31b appears across winding 33b of the current transformer and establishes a current flow through a second discharging path including capacitor 31b, winding 33b, and thyristor 32b. During this same time, because of the coupling between windings 33a and 33b, a voltage substantially equal to the voltage across winding 33b is induced across winding 33a. This induced voltage establishes a current flow through a second charging path including winding 33a, capacitor 31a, thyristor 32b, inductor 34, and diode 35. The current flow in this path charges capacitor 31a at a rate determined primarily by the values of capacitors 31a and 31b and inductor 34 and is, therefore, a resonant current flow. At the same time, due to the coupling between windings 33a and 33b, the current flow in the second discharging path discharges capacitor 31a at a similar rate and also is, therefore a resonant current flow. Thus, the turn-on of thyristor 32b establishes, through a second discharge path, a resonant current which discharges capacitor 31b at a predetermined rate and, through a second charging path, a resonant current which charges capacitor 31a at substantially the same rate.

As capacitor 31b discharges, the coupling between windings 33a and 33b causes capacitor 31a to charge until the voltages across both capacitors are equal. At this time, due to the flywheel effect of inductor 34, capacitor 31a continues to charge and capacitor 31b continues to discharge until capacitor 31a is charged to a voltage substantially equal to the voltage of supply 10 and capacitor 31b is discharged to a voltage substantially equal to zero.

After capacitor 31a is fully charged, diode 35 becomes reverse biased to stop the flow of current through the capacitors and thereby prevents a further exchange of energy therebetween. In addition, as the above described current decreases to zero, thyristor 32b turns off. At this time, capacitor 31b is uncharged and capacitor 31a is fully charged. It will, therefore, be seen that, before the beginning of the negative half-cycle of the a-c voltage, voltage shifting means 30 forces capacitor 31b to assume a discharged condition. As a result, thyristor 25b can be turned on to establish the negative half-cycle of the a-c voltage without giving rise to a destructive capacitive discharge therethrough. It will also be seen that, before the beginning of the negative half-cycle of the a-c voltage, voltage shifting means 30 not only forces capacitor 31a to assume a fully charged condition, but also forces it to assume that charged condition at a predetermined rate. As a result, thyristor 25a will be exposed to its full forward voltage without having been exposed to excessive rates of change in that forward voltage.

It will be understood that since thyristor 29a was allowed to turn off before thyristor 25b was turned on, capacitor 26 may not be restored to its fully charged condition after having turned off thyristor 25a. In order to restore capacitor 26 to that condition, thyristor 29a may be turned on with thyristor 25b after the capacitor voltages have been shifted. Thus, the firing sequence of thyristors 25a, 25b, 29a and 29b may be different from the firing sequence which would be utilized in the absence of voltage shifting network 30.

In view of the foregoing, it will be seen that, before the positive half-cycle of the a-c voltage, voltage shifting means 30 forces the potential of a-c bus 16 to change at a predetermined rate from the potential of negative bus 15 to the potential of positive bus 14. Similarly, before the negative half-cycle of the a-c voltage, voltage shifting means 30 forces the potential of a-c bus 16 to change at a predetermined rate from the potential of positive bus 14 to the potential of negative bus 15. As a result, voltage shifting means 30 protects thyristors 25a and 25b from excessive rates of change of voltage.

In view of the foregoing, it will also be seen that voltage shifting means 30 transfers the energy stored by the capacitor connected across the next conducting thyristor to the capacitor connected across the last conducting thyristor. As a result, voltage shifting means 30 not only protects thyristors 25a and 25b from excessive forward $dv/dt$, but also protects those thyristors from destructive capacitive discharge currents and prevents the energy which is trapped in the capacitors after commutation from being merely dissipated in the form of heat after each half-cycle.

In addition, it has been found that voltage shifting means 30 automatically adjusts the amount of energy it shifts between the capacitors in response to the type of load. When, for example, load 12 is highly inductive, voltage shifting means 30 reduces the amount of energy it shifts between the capacitors. This is advantageous since an inductive load draws current from the fully charged capacitor when both power thyristors are non-conducting. As a result, the load current causes the capacitor connected across the last conducting thyristor to charge and the capacitor connected across the next conducting thyristor to discharge. Advantageously, voltage shifting means 30 automatically reduces the energy it shifts between the capacitors when load 12 is highly inductive, thereby allowing the load to shift part of the energy between the capacitors. This automatic reduction of energy shifted by voltage shifting means 30 is due to the fact that part of the capacitive discharge current flows through load 12 rather than one of the windings of the current transformer. Thus, when the load reduces the voltage across the fully charged capacitor, voltage shifting means 30 automatically reduces the amount of energy that it shifts and thereby allows the load to shift the capacitor voltages.

Similarly, when load 12 is highly capacitive, voltage shifting means 30 automatically increases the amount of energy it shifts between the capacitors. This automatic increase of energy is advantageous since capacitive loads tend to prevent the capacitor voltages from shifting. As a result, when the load prevents the capacitor voltages from shifting, voltage shifting means 30 automatically increases the amount of energy that it shifts and thereby forces the capacitor voltages to shift. Thus, voltage shifting means 30 automatically adjusts the amount of energy it shifts between the capacitors in response to the load.

In view of the foregoing, it will be seen that capacitors 31a and 31b and voltage shifting means 30 establish, across each of the series-connected power switches 25a and 25b, a rate of rise of forward voltage which is less than the $dv/dt$ turn-on rate and prevent either capacitor from establishing, through one of the series-connected power switches, a discharge current which would damage the thyristors. Thus, capacitors 31a and 31b and voltage shifting means 30 limit the rate of rise of forward voltage without establishing discharge currents which would damage the thyristors.

Figure 2:
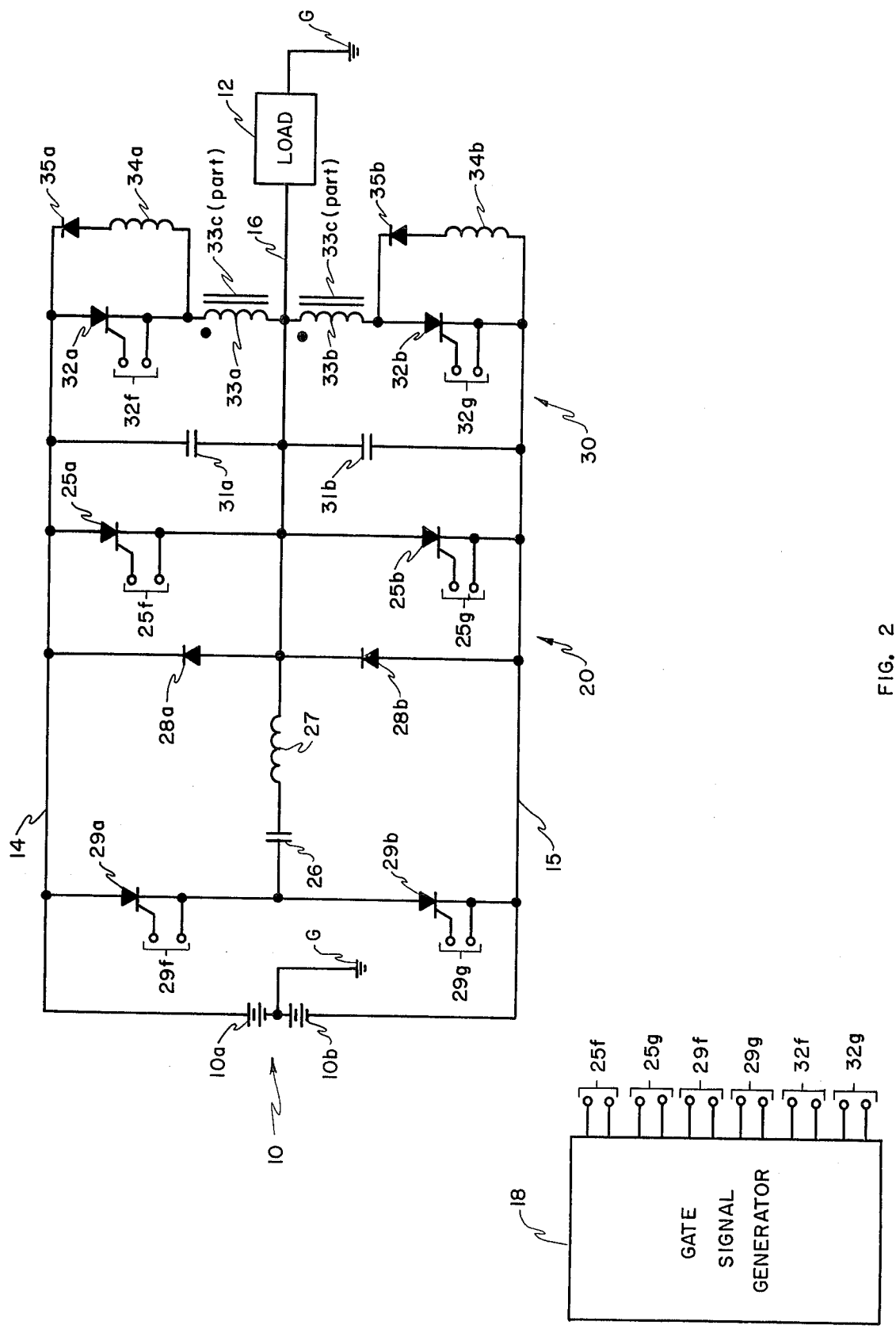
FIG. 2 shows a schematic diagram of another illustrative embodiment of the invention.

The circuitry shown in FIG. 2 is similar to the circuitry shown in FIG. 1 and corresponding elements are similarly numbered. In the circuit of FIG. 2, however, windings 33a and 33b, rather than thyristors 32a and 32b, are connected at a common point with a-c bus 16. In the presence of this connection, thyristor 32a and thyristor 32b may each have an inductor and a diode connected in inverse parallel thereacross in order to establish the desired resonant current flows. In operation, upon the turn-on of thyristor 32a (before the beginning of the positive half-cycle of the a-c voltage), the voltage across capacitor 31a establishes a current flow through a first discharging path including capacitor 31a, thyristor 32a, and winding 33a. At the same time, the induced voltage across winding 33b establishes a current flow through a first charging path including winding 33b, capacitor 31b, inductor 34b, and diode 35b. Similarly, upon the turn-on of thyristor 32b (before the beginning of the negative half-cycle of the a-c voltage), the voltage across capacitor 31b establishes a current flow through a second discharging path including capacitor 31b, winding 33b, and thyristor 32b. At the same time, the induced voltage across winding 33a establishes a current flow through a second charging path including winding 33a, inductor 34a, diode 35 a, and capacitor 31a. Thus, as in the circuit of FIG. 1, the circuitry shown in FIG. 2 establishes, before the beginning of the positive half-cycle of the a-c voltage, a first discharging path through capacitor 31a and a first charging path through capacitor 31b. Similarly, the circuitry shown in FIG. 2 establishes, before the beginning of the negative half-cycle of the a-c voltage, a second discharging path through capacitor 31b and a second charging path through capacitor 31a.

Figure 3:
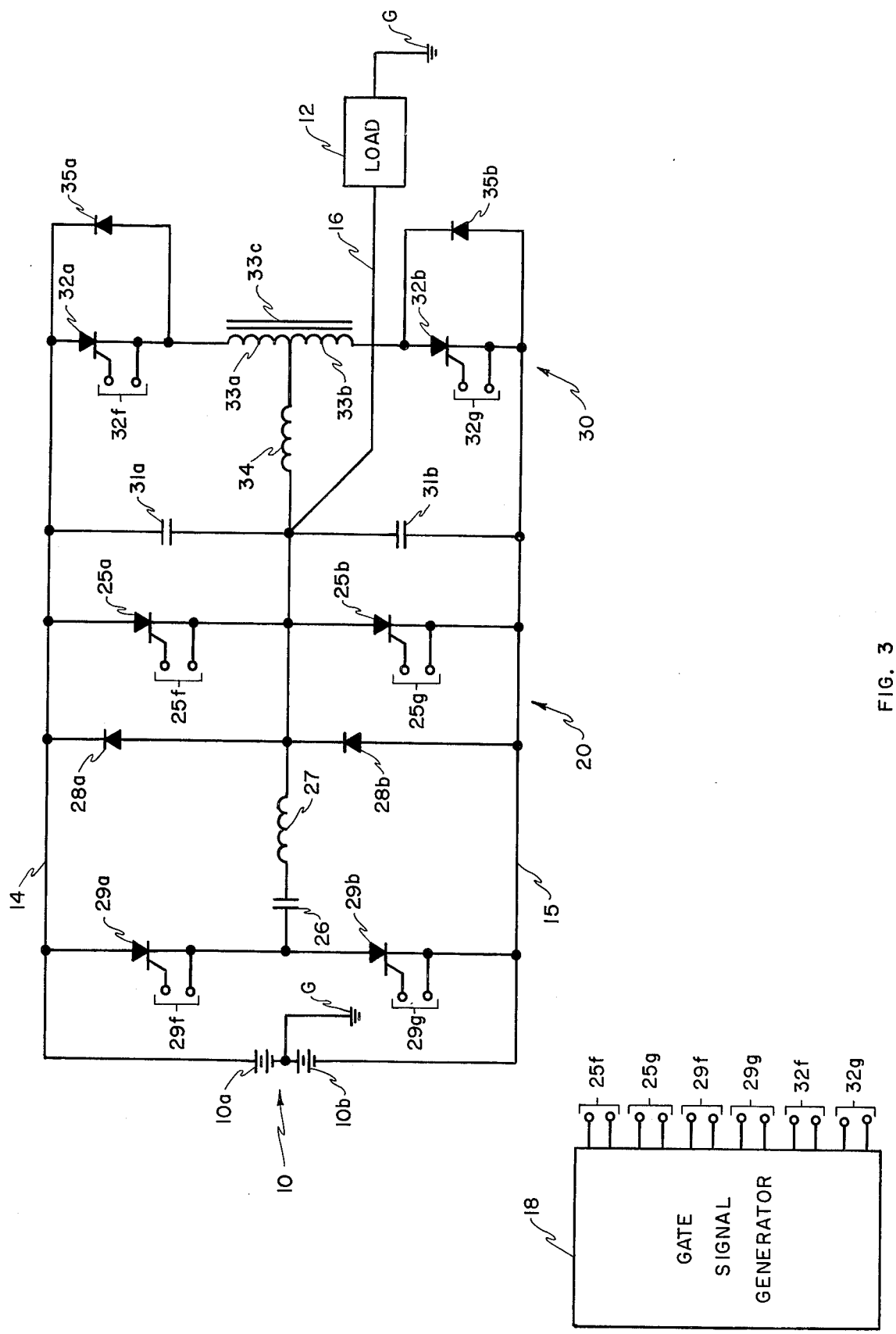
FIG. 3 is a schematic diagram of still another illustrative embodiment of the invention.

The circuitry shown in FIG. 3 is similar to the circuitry shown in FIG. 2 and corresponding elements are similarly numbered. In the circuit of FIG. 3, however, inductor 34 is connected in each discharging current path as well as in each charging current path. As a result of this connection, upon the turn-on of thyristor 32a (before the beginning of the positive half-cycle of the a-c voltage), the voltage across capacitor 31a establishes a current flow through a first discharging path including capacitor 31a, thyristor 32a, winding 33a, and inductor 34. At the same time, the induced voltage on winding 33b establishes a current flow through a first charging path including winding 33b, inductor 34, capacitor 31b, and diode 35b. Similarly, upon the turn-on of thyristor 32b (before the beginning of the negative half-cycle of the a-c voltage), the voltage across capacitor 31b establishes a current flow through a second discharging path including capacitor 31b, inductor 34, winding 33b, and thyristor 32b. At the same time, the induced voltage on winding 33a establishes a current flow in a second charging path including winding 33a, diode 35a, capacitor 31a, and inductor 34. Thus, as in the circuits shown in FIG. 1 and FIG. 2, the circuitry shown in FIG. 3 establishes, before the beginning of the positive half-cycle of the a-c voltage, a first discharging path through capacitor 31a and a first charging path through capacitor 31b. Similarly, the circuitry shown in FIG. 3 establishes, before the beginning of the negative half-cycle of the a-c voltage, a second discharging path through capacitor 31b and a second charging path through capacitor 31a.

In view of the foregoing, it will be seen that a circuit constructed in accordance with the invention will limit the rate of rise of forward voltage across the power thyristors without merely dissipating the energy stored in the capacitors and without establishing a discharge current through the power thyristors.

It will be understood that the embodiments shown herein are for illustrative purposes only and may be changed or modified without departing from the spirit and scope of the appended claims.

What is claimed is:

1. In a circuit for preventing the rate of rise of voltage across each of first and second series-connected, alternately-conducting power switches from exceeding a predetermined value, the combination of:

first and second capacitance means for limiting the rate of rise of voltage across each power switch;

means for connecting the first capacitance means across the first power switch;

means for connecting the second capacitance means across the second power switch;

voltage shifting means for transferring the charge on the first capacitance means to the second capacitance means when both power switches are non-conducting as a result of the turn-off of the second power switch and for transferring the charge on the second capacitance means to the first capacitance means when both power switches are non-conducting as a result of the turn-off of the first power switch.

2. In a circuit for limiting the rate of rise of voltage across first and second series-connected, alternately-conducting switching components, the combination of:

first capacitance means for limiting the rate of rise of voltage across the first switching component;

means for connecting the first capacitance means across the first power switching component;

second capacitance means for limiting the rate of rise of voltage across the second switching component;

means for connecting the second capacitance means across the second switching component;

first discharging means for resonantly discharging the first capacitance means when the first capacitance means is charged and both of the series-connected switching components are non-conducting.

second discharging means for resonantly discharging the second capacitance means when the second capacitance means is charged and both of the series-connected switching components are non-conducting;

first charging means for resonantly charging the second capacitance means when the first discharging means discharges the first capacitance means; and second charging means for resonantly charging the first capacitance means when the second discharging means discharges the second capacitance means.

3. A circuit as set forth in claim 2 wherein the first and second charging means include a transformer having a first winding connected to the first discharging means and to the first capacitance means and a second winding connected to the second discharging means and to the second capacitance means.

4. A circuit as set forth in claim 2, wherein the first charging means includes inductance means for resonantly charging the second capacitance means.

5. A circuit as set forth in claim 2, wherein the second charging means includes inductance means for resonantly charging the first capacitance means.

6. A circuit as set forth in claim 2, wherein the first charging means includes diode means for preventing the first charging current from flowing in a reverse direction.

7. A circuit as set forth in claim 2 wherein the second charging means includes diode means for preventing the second charging current from flowing in a reverse direction.

8. In a circuit for limiting the rate of rise of voltage across first and second series-connected, alternately-conducting switching components, the combination of:

first capacitance means for limiting the rate of rise of voltage across the first switching component;

means for connecting the first capacitance means across the first switching component;

second capacitance means for limiting the rate of rise of voltage across the second switching component;

means for connecting the second capacitance means across the second switching component;

a transformer having first and second windings;

a first charging path including the second capacitance means and the second winding;

a second charging path including the first capacitance means and the first winding;

a first discharging switch;

a second discharging switch;

a first discharging path including the first capacitance means, the first winding, and the first discharging switch, the first discharging switch serving as means for initiating the flow of current through the first discharging and charging paths; and a second discharging path including the second capacitance means, the second winding, and the second discharging switch, the second discharging switch serving as means for initiating the flow of current through the second discharging and charging paths.

9. A circuit as set forth in claim 8 wherein the first charging path includes an inductor and a diode.

10. A circuit as set forth in claim 8 wherein the second charging path includes an inductor and a diode.

11. In an inverter circuit, the combination of:

a positive bus;

a negative bus;

an a-c bus;

first power switching means for controlling the flow of current between the positive bus and the a-c bus;

second power switching means for controlling the flow of current between the a-c bus and the negative bus;

a commutating capacitor and a commutating inductor for applying resonant commutating currents to the first and second power switching means;

a first commutating switch for initiating the application of resonant commutating current to the first power switching means;

a second commutating switch for initiating the application of resonant commutating current to the second power switching means;

a first commutating diode connected across the first power switching means;

a second commutating diode connected across the second power switching means;

a first capacitor connected across the first power switching means;

a second capacitor connected across the second power switching means; and voltage shifting means for transferring the charge from the charged capacitor to the uncharged capacitor when the first and second power switching means are non-conducting.

12. A circuit as set forth in claim 11 wherein the voltage shifting means comprises:
  a transformer having first and second windings;
  a first charging path including the second capacitance means and the second winding;
  a second charging path including the first capacitance means and the first winding;
  a first discharging switch;
  a second discharging switch;
  a first discharging path including the first capacitance means, the first winding, and the first discharging switch, the first discharging switch serving as means for initiating the flow of current through the first discharging and charging paths; and
  a second discharging path including the second capacitance means, the second winding, and the second discharging switch, the second discharging switch serving as means for initiating the flow of current through the second discharging and charging paths.

13. A circuit as set forth in claim 12 wherein the first charging path includes an inductor and a diode.

14. A circuit as set forth in claim 12 wherein the second charging path includes an inductor and a diode.

15. In an inverter circuit, the combination of:
  a positive bus;
  a negative bus;
  an a-c bus;
  a first power switch connected between the positive bus and the a-c bus;
  a second power switch connected between the negative bus and the a-c bus;
  a first commutating diode connected across the first power switch;
  a second commutating diode connected across the second power switch;
  a first commutating switch connected to the positive bus;
  a second commutating switch connected to the negative bus;
  a commutating inductor;
  a commutating capacitor connected, through the commutating inductor and the first commutating switch, between the a-c bus and the positive bus and connected, through the commutating inductor and the second commutating switch, between the a-c bus and the negative bus;
  a first capacitor connected across the first power switch;
  a second capacitor connected across the second power switch;
  a transformer having first and second windings;
  a first discharging switch connected, through the first winding, across the first capacitor;
  a second discharging switch connected, through the second winding, across the second capacitor;
  a diode connected across both discharging switches;
  an inductor in series with the diode.

16. In a inverter circuit, the combination of:
  a positive bus;
  a negative bus;
  an a-c bus;
  a first power switch connected between the positive bus and the a-c bus;
  a second power switch connected between the negative bus and the a-c bus;
  a first commutating diode connected across the first power switch;
  a second commutating diode connected across the second power switch;
  a first commutating switch connected to the positive bus;
  a second commutating switch connected to the negative bus;
  a commutating inductor;
  a commutating capacitor connected, through the commutating inductor and the first commutating switch, between the a-c bus and the positive bus and connected, through the commutating inductor and the second commutating switch, between the a-c bus and the negative bus;
  a first capacitor connected across the first power switch;
  a second capacitor connected across the second power switch;
  a transformer having first and second windings;
  a first discharging switch connected, through the first winding, across the first capacitor;
  a second discharging switch connected, through the second winding, across the second capacitor;
  an inductor connected across each discharging switch; and
  a diode in series with each inductor.

17. In an inverter circuit, the combination of:
  a positive bus;
  a negative bus;
  an a-c bus;
  a first power switch connected between the positive bus and the a-c bus;
  a second power switch connected between the negative bus and the a-c bus;
  a first commutating diode connected across the first power switch;
  a second commutating diode connected across the second power switch;
  a first commutating switch connected to the positive bus;
  a second commutating switch connected to the negative bus;
  a commutating inductor;
  a commutating capacitor connected, through the commutating inductor and the first commutating switch, between the a-c bus and the positive bus and connected, through the commutating inductor and the second commutating switch, between the a-c bus and the negative bus;
  a first capacitor connected across the first power switch;
  a second capacitor connected across the second power switch;
  an inductor;
  a transformer having first and second windings;
  a first discharging switch connected, through the inductor and the first winding, across the first capacitor;
  a second discharging switch connected, through the inductor and the second winding, across the second capacitor; and
  a diode connected across each discharging switch.

* * * * *